United States Patent
Chen et al.

(10) Patent No.: US 11,260,872 B2
(45) Date of Patent: Mar. 1, 2022

(54) SYSTEM AND METHOD FOR UTILIZING A TEMPORAL RECURRENT NETWORK FOR ONLINE ACTION DETECTION

(71) Applicant: Honda Motor Co., Ltd., Tokyo (JP)

(72) Inventors: Yi-Ting Chen, Sunnyvale, CA (US); Mingze Xu, Bloomington, IN (US); Mingfei Gao, Greenbelt, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 16/159,194

(22) Filed: Oct. 12, 2018

(65) Prior Publication Data
US 2020/0114924 A1    Apr. 16, 2020

(51) Int. Cl.
| | |
|---|---|
| *B60W 40/09* | (2012.01) |
| *B60W 50/00* | (2006.01) |
| *G06K 9/00* | (2006.01) |
| *G05D 1/02* | (2020.01) |
| *G06N 20/00* | (2019.01) |

(52) U.S. Cl.
CPC ........ *B60W 40/09* (2013.01); *B60W 50/0098* (2013.01); *G05D 1/0221* (2013.01); *G06K 9/00791* (2013.01); *G06K 9/00845* (2013.01); *G06N 20/00* (2019.01)

(58) Field of Classification Search
CPC .. B60W 40/09; B60W 50/0098; G06N 20/00; G05D 1/0221; G06K 9/00791; G06K 9/00845
See application file for complete search history.

(56) References Cited

U.S. PATENT DOCUMENTS

| | | | |
|---|---|---|---|
| 2015/0347918 A1* | 12/2015 | Lucey | G06N 7/005 706/12 |
| 2018/0032082 A1* | 2/2018 | Shalev-Shwartz | G06N 3/0445 |
| 2018/0053103 A1* | 2/2018 | Delgado | G06N 5/04 |
| 2018/0246521 A1* | 8/2018 | Seo | G06K 9/00825 |
| 2020/0051252 A1* | 2/2020 | Brown | G05D 1/0088 |
| 2020/0092565 A1* | 3/2020 | Watters | H04N 19/139 |

FOREIGN PATENT DOCUMENTS

CN    108513059    9/2018

OTHER PUBLICATIONS

S. Ren, K. He, R. Girshick, and J. Sun. Faster R-CNN: Towards Real-Time Object Detection with Region Proposal Networks. In NIPS, 2015.

(Continued)

*Primary Examiner* — Geepy Pe
*Assistant Examiner* — Bakari Underwood
(74) *Attorney, Agent, or Firm* — Rankin, Hill & Clark LLP

(57) ABSTRACT

A system and method for utilizing a temporal recurrent network for online action detection that include receiving image data that is based on at least one image captured by a vehicle camera system. The system and method also include analyzing the image data to determine a plurality of image frames and outputting at least one goal-oriented action as determined during a current image frame. The system and method further include controlling a vehicle to be autonomously driven based on a naturalistic driving behavior data set that includes the at least one goal-oriented action.

20 Claims, 8 Drawing Sheets

(56) References Cited

OTHER PUBLICATIONS

E. Santana and G. Hotz. Learning a Driving Simulator. CoRR, abs/1608.01230, 2016.

M. Schmidt, U. Hofmann, and M. Bouzouraa. A Novel Goal Oriented Concept for Situation Representation for ADAS and Automated Driving. In ITSC, 2014.

Z. Shou, J. Chan, A. Zareian, K. Miyazawa, and S. Chang. CDC: Convolutional-De-Convolutional Networks for Precise Temporal Action Localization in Untrimmed Videos. In CVPR, 2017.

Z. Shou, J. Pan, J. Chan, K. Miyazawa, H. Mansour, A. Vetro, X. Giro-i Nieto, and S.-F. Chang. Online action detection in untrimmed, streaming videos—modeling and evaluation. ECCV, 2018.

Z. Shou, D. Wang, and S.-F. Chang. Temporal action localization in untrimmed videos via multi-stage cnns. In Proceedings of the IEEE Conference on Computer Vision and Pattern Recognition, pp. 1049-1058, 2016.

G. A. Sigurdsson, G. Varol, X. Wang, A. Farhadi, I. Laptev, and A. Gupta. Hollywood in Homes: Crowdsourcing Data Collection for Activity Understanding. In ECCV, 2016.

Christian Szegedy, Sergey Ioffe, and Vincent Vanhoucke. Inception-v4, Inception—ResNet and the Impact of Residual Connections on Learning. CoRR, 2016.

Udacity. Public driving dataset. https://www.udacity.com/self-driving-car, 2017.

Chien-Yi Wang, Athma Narayanan, Abhishek Patil, and Yi-Ting Chen. A 3D Dynamic Scene Analysis framework for Development of Intelligent Transportation Systems. In IV, 2018.

H. Xu, Y. Gao, F. Yu, and T. Darrell. End-To-End Learn-ing of Driving Models From Large-Scale Video Datasets. In CVPR, 2016.

Wei Zhan, Changliu Liu, Ching-Yao Chan, and Masayoshi Tomizuka. A Non-conservatively Defensive Strategy for Urban Autonomous Driving. In ITSC, 2016.

D. Zhang, X. Dai, X. Wang, and Y.-F. Wang. S3d: Single shot multi-span detector via fully 3d convolutional networks. arXiv preprint arXiv:1807.08069, 2018.

H. Zhao, J. Shi, X. Qi, X. Wang, and J. Jia. Pyramid Scene Parsing Network. In CVPR, 2017.

Tinghui Zhou, Matthew Brown, Noah Snavely, and David G. Lowe. Unsupervised Learning of Depth and Ego-Motion from Video. In CVPR, 2017.

A. Agrawal, J. Lu, S. Antol, M. Mitchell, C. L. Zitnick, D. Batra, and D. Parikh. VQA: Visual Question Answering. In ICCV, 2015.

Pulkit Agrawal, Joao Carreira, and Jitendra Malik. Learning to See by Moving. In ICCV, 2015.

J. Andreas, M. Rohrbach, T. Darrell, and D. Klein. Learning to Compose Neural Networks for Question Answering. In CVPR, 2016.

Ioan Andrei Barsan, Peidong Liu, Marc Pollefeys, and Andreas Geiger. Robust Dense Mapping for Large-Scale Dynamic Environments. In ICRA, 2018.

Y.-W. Chao, S. Vijayanarasimhan, B. Seybold, D. A. Ross, J. Deng, and R. Sukthankar. Rethinking the faster r-cnn architecture for temporal action localization. In Proceedings of the IEEE Conference on Computer Vision and Pattern Recognition, pp. 1130-1139, 2018.

C. Chen, A. Seff, A. Kornhauser, and J. Xiao. DeepDriving: Learn-ing Affordance for Direct Perception in Autonomous Driving. In ICCV, 2015.

Liang-Chieh Chen, George Papandreou, Iasonas Kokkinos, Kevin Murphy, and Alan Yuille. DeepLab: Semantic Image Segmentation with Deep Convolutional Nets, Atrous Convolution, and Fully Connected CRFs. TPAMI, 2018.

K. Cho, B. Van Merrie͂nboer, C. Gulcehre, D. Bahdanau, F. Bougares, H. Schwenk, and Y. Bengio. Learning phrase representations using rnn encoder-decoder for statistical machine translation. arXiv preprint arXiv:1406.1078, 2014.

M. Cordts, M. Omran, S. Ramos, T. Rehfeld, M. Enzweiler, R. Benenson, U. Franke, S. Roth, and B. Schiele. The Cityscapes Dataset for Semantic Urban Scene Understanding. In CVPR, 2016.

X. Dai, B. Singh, G. Zhang, L. S. Davis, and Y. Q. Chen. Temporal context network for activity localization in videos. In Computer Vision (ICCV), 2017 IEEE International Conference on, pp. 5727-5736. IEEE, 2017.

R. De Geest, E. Gavves, A. Ghodrati, Z. Li, C. Snoek, and T. Tuytelaars. Online action detection. In ECCV, 2016.

J. Deng, W. Dong, R. Socher, L.-J. Li, K. Li, and L. Fei-Fei. ImageNet: A Large-Scale Hierarchical Image Database. In CVPR, 2009.

Nachiket Deo and Mohan Trivedi. Learning and Predicting On-road Pedestrian Behavior around Vehicles. In ITSC, 2017.

Anup Doshi and Mohan M. Trivedi. Tactical Driver Behavior Prediction and Intent Inference: A Review. In ITSC, 2011.

Kiana Ehsani, Hessam Bagherinezhad, Joseph Redmon, Roozbeh Mottaghi, and Ali Farhadi. Who Let The Dogs Out? Modeling Dog Behavior From Visual Data. CVPR, 2018.

J. Gao, Z. Yang, and R. Nevatia. Red: Reinforced encoder-decoder networks for action anticipation. BMVC, 2017.

A. Geiger, P. Lenz, and R. Urtasun. Are We Ready for Au-tonomous Driving? The KITTI Vision Benchmark Suite. In CVPR, 2012.

Caner Hazirbas, Lingni Ma, Csaba Domokos, and Daniel Cremers. Fusenet: Incorporating Depth Into Semantic Segmentation via Fusion-based CNN Architecture. In ACCV, 2016.

K. He, G. Gkioxari, P. Dollar, and R. Girshick. Mask R-CNN. In ICCV, 2017.

K. He, X. Zhang, S. Ren, and J. Sun. Deep Residual Learning for Image Recognition. In CVPR, 2016.

F. C. Heilbron, V. Escorcia, B. Ghanem, and J. C. Niebles. ActivityNet: A Large-Scale Video Benchmark for Human Activity Understand-ing. In CVPR, 2015.

M. Hoai and F. De la Torre. Max-margin Early Event Detectors. IJCV, 2014.

S. Hochreiter and J. Schmidhuber. Long short-term memory. Neural computation, 9(8):1735-1780, 1997.

R. Hu, J. Andreas, M. Rohrbach, T. Darrell, and K. Saenko. Learning to Reason: End-To-End Module Networks for Visual Question Answering. In ICCV, 2017.

Ashesh Jain, Amir R. Zamir, Silvio Savarese, and Ashutosh Saxena. Structural-RNN: Deep Learning on Spatio-Temporal Graphs. In CVPR, 2016.

A. Jain, H. S. Koppula, B. Raghavan, S. Soh, and A. Saxena. Car that Knows Before You Do: Anticipating Maneuvers via Learning Temporal Driving Models. In ICCV, 2015.

D. Jayaraman and K. Grauman. Learning Image Representations Tied to Egomotion from Unlabeled Video. International Journal of Computer Vision, 125(1):136-161, 2017.

J. Johnson, B. Hariharan, L. van der Maaten, L. Fei-Fei, C. L. Zitnick, and R. Girshick. CLEVR: A Diagnostic Dataset for Com-positional Language and Elementary Visual Reasoning. In CVPR, 2017.

K. Kaust. End-to-end, single-stream temporal action detection in untrimmed videos.

W. Kay, J. Carreira, K. Simonyan, B. Zhang, C. Hillier, S. Vijayanarasimhan, F. Viola, T. Green, T. Back, P. Nat-sev, M. Suleyman, and A. Zisserman. The Kinetics Human Action Video Dataset. CoRR, abs/1705.06950, 2017.

C. G. Keller and D. M. Gavrila. Will the Pedestrian Cross? A Study on Pedestrian Path Prediction. IEEE Transactions on Intelligent Transportation Systems, 15(2):494-506, 2014.

Diederik Kingma and Jimmy Ba. Adam: A Method for Stochastic Optimization. In ICLR, 2014.

K. Kitani, B. Ziebart, J. Bagnell, and M. Hebert. Activity forecast-ing. In ECCV, 2012.

J. Kooij, N. Schneider, F. Flohr, and D. Gavrila. Context-based Pedestrian Path Prediction. In ECCV, 2014.

Namhoon Lee, Wongun Choi, Paul Vernaza, Christopher B. Choy, Philip H. S. Torr, and Manmohan Chandraker. Desire: Distant Future Prediction in Dynamic Scenes with Interacting Agents. In CVPR, 2017.

(56) References Cited

OTHER PUBLICATIONS

Ruiyu Li, Makarand Tapaswi, Renjie Liao, Jiaya Jia, Raquel Urtasun, and Sanja Fidler. Situation Recognition with Graph Neural Networks. In ICCV, 2017.
Tsung-Yi Lin, Piotr Dollar, Ross Girshick, Kaiming He, Bharath Hariharan, and Serge Belongie. Feature Pyramid Networks for Object Detection. In CVPR, 2017.
Tsung-Yi Lin, Priya Goyal, Ross Girshick, Kaiming He, and Piotr Dollar. Focal Loss for Dense Object Detection. In ICCV, 2017.
T.-Y. Lin, M. Maire, S. Belongie, J. Hays, P. Perona, D. Ra-manan, P. Dollr, and C. L. Zitnick. Microsoft COCO: Common Objects in Context. In ECCV, 2009.
Shugao Ma, Leonid Sigal, and Stan Sclaroff. Learning Activity Progression in LSTMs for Activity Detection and Early Detection. In CVPR, 2016.
W. Maddern, G. Pascoe, C. Linegar, and P. Newman. 1 Year, 1000km: The Oxford RobotCar Dataset. The International Journal of Robotics Research, 36(1):3-15, 2017.
V. Madhavan and T. Darrell. The BDD-Nexar Collective: A Large-Scale, Crowsourced, Dataset of Driving Scenes. Master's thesis, EECS Department, University of California, Berkeley, May 2017.
J. A. Michon. A Critical View of Driver Behavior Models: What Do We Know, What Should We Do? Human Behavior and Traffic Safety, pp. 485-520, 1985.
K. Nakamura, S. Yeung, A. Alahi, and L. Fei-Fei. Jointly Learning Energy Expenditures and Activities using Egocentric Multimodal Signals. In CVPR, 2017.
Nuria Oliver and Alex Pentland. Graphical Models for Driver Behavior Recognition in a SmartCar. In IV, 2000.
Adam Paszke, Sam Gross, Soumith Chintala, Gregory Chanan, Edward Yang, Zachary DeVito, Zeming Lin, Alban Desmaison, Luca Antiga, and Adam Lerer. Automatic Differentiation in PyTorch. In NIPS-W, 2017.
Siyuan Qi and Song-Chun Zhu. Intent-aware Multi-agent Reinforcement Learning. In ICRA, 2018.
V. Ramanishka, Y.-T. Chen, T. Misu, and K. Saenko. Toward driving scene understanding: A dataset for learning driver behavior and causal reasoning. In CVPR, 2018.
A. Rasouli, I. Kotseruba, and J. K. Tsotsos. Are They Going to Cross? A Benchmark Dataset and Baseline for Pedestrian Crosswalk Behavior. In ICCVW, 2017.
Office Action of Chinese Serial No. 201910872679.6 dated Dec. 3, 2020, 6 pages.

* cited by examiner

| GOAL-DRIVEN ACTION | # INSTANCES | AVG./STD. DURATION |
|---|---|---|
| INTERSECTION PASSING | 6396 | 3.48 / 2.19 |
| LEFT TURN | 1673 | 5.71 / 3.41 |
| RIGHT TURN | 1668 | 5.14 / 2.48 |
| LEFT LANE CHANGE | 600 | 3.32 / 1.83 |
| RIGHT LANE CHANGE | 558 | 3.35 / 1.67 |
| CROSSWALK PASSING | 835 | 1.19 / 1.39 |
| U-TURN | 85 | 9.96 / 5.51 |
| LEFT LANE BRANCH | 283 | 2.57 / 1.14 |
| RIGHT LANE BRANCH | 112 | 2.68 / 1.42 |
| MERGE | 172 | 3.00 / 2.21 |
| STIMULUS-DRIVEN ACTION | # INSTANCES | AVG./STD. DURATION |
| STOP | 5325 | 4.08 / 2.03 |
| DEVIATE | 181 | 4.63 / 2.45 |
| CAUSE | # INSTANCES | AVG./STD. DURATION |
| SIGN | 2423 | 4.28 / 2.44 |
| CONGESTION | 1989 | 3.86 / 1.59 |
| TRAFFIC LIGHT | 761 | 4.05 / 1.47 |
| PEDESTRIAN | 104 | 4.05 / 1.47 |
| PARKED CAR | 171 | 4.74 / 2.49 |
| ATTENTION | # INSTANCES | AVG./STD. DURATION |
| CROSSING VEHICLE | 2088 | 8.85 / 11.92 |
| CROSSING PEDESTRIAN | 861 | 7.20 / 5.20 |
| RED LIGHT | 1500 | 25.72 / 20.45 |
| CUT-IN | 474 | 3.43 / 1.63 |
| SIGN | 312 | 2.38 / 1.96 |
| ON-ROAD BICYCLIST | 397 | 4.38 / 5.65 |
| PARKED VEHICLE | 199 | 2.93 / 3.23 |
| MERGING VEHICLE | 476 | 4.39 / 4.26 |
| YELLOW LIGHT | 263 | 3.37 / 4.41 |
| ROAD WORK | 134 | 12.74 / 14.99 |
| PEDESTRIAN NEAR EGO LANE | 77 | 2.80 / 2.18 |

FIG. 4

SYSTEM AND METHOD FOR UTILIZING A TEMPORAL RECURRENT NETWORK FOR ONLINE ACTION DETECTION

BACKGROUND

Most autonomous driving systems take sensor data into account when providing autonomous driving functionality. The sensor data takes into account objects, roadways, and obstacles that may be faced by the vehicle during vehicle operation in real-time. However, these systems do not provide vehicle operation that takes a driver's logic, attentive behavior, and causal reactions into account when providing autonomous driving functionality. In many cases an independent annotator has to evaluate sensor data collected from an elongated period of time to gather information to determine a high level situational understanding of the vehicle and the surrounding environment of the vehicle. Consequently, such systems do not efficiently address many challenges associated with higher level situational understanding that may be necessary to provide an intelligent automated driving system that efficiently adapts to various scenarios within a dynamic driving environment as the vehicle is being driven in time sensitive traffic scenarios.

BRIEF DESCRIPTION

According to one aspect, a computer-implemented method for utilizing a temporal recurrent network for online action detection that includes receiving image data that is based on at least one image captured by a vehicle camera system. The computer-implemented method also includes analyzing the image data to determine a plurality of image frames. The plurality of image frames include at least one past image frame, and a current image frame. The computer-implemented method additionally includes outputting at least one goal-oriented action as determined during the current image frame. The at least one goal-oriented action is based on the at least one past image frame, the current image frame, and at least one predicted action. The computer-implemented method further includes controlling a vehicle to be autonomously driven based on a naturalistic driving behavior data set that includes the at least one goal-oriented action.

According to another aspect, a system for utilizing a temporal recurrent network for online action detection that includes a memory storing instructions when executed by a processor that cause the processor to receive image data that is based on at least one image captured by a vehicle camera system. The instructions also cause the processor to analyze the image data to determine a plurality of image frames. The plurality of image frames include at least one past image frame, and a current image frame. The instructions additionally cause the processor to output at least one goal-oriented action as determined during the current image frame. The at least one goal-oriented action is based on the at least one past image frame, the current image frame, and at least one predicted action. The instructions further cause the processor to control a vehicle to be autonomously driven based on a naturalistic driving behavior data set that includes the at least one goal-oriented action.

According to still another aspect, a non-transitory computer readable storage medium storing instructions that when executed by a computer, which includes a processor perform a method that includes receiving image data that is based on at least one image captured by a vehicle camera system. The method also includes analyzing the image data to determine a plurality of image frames. The plurality of image frames include at least one past image frame, and a current image frame. The method additionally includes outputting at least one goal-oriented action as determined during the current image frame. The at least one goal-oriented action is based on the at least one past image frame, the current image frame, and at least one predicted action. The method further includes controlling a vehicle to be autonomously driven based on a naturalistic driving behavior data set that includes the at least one goal-oriented action.

BRIEF DESCRIPTION OF THE DRAWINGS

FIG. 4 is an illustrated example of the naturalistic driving behavior data set according to an exemplary embodiment of the present disclosure;

DETAILED DESCRIPTION

Figure 1:
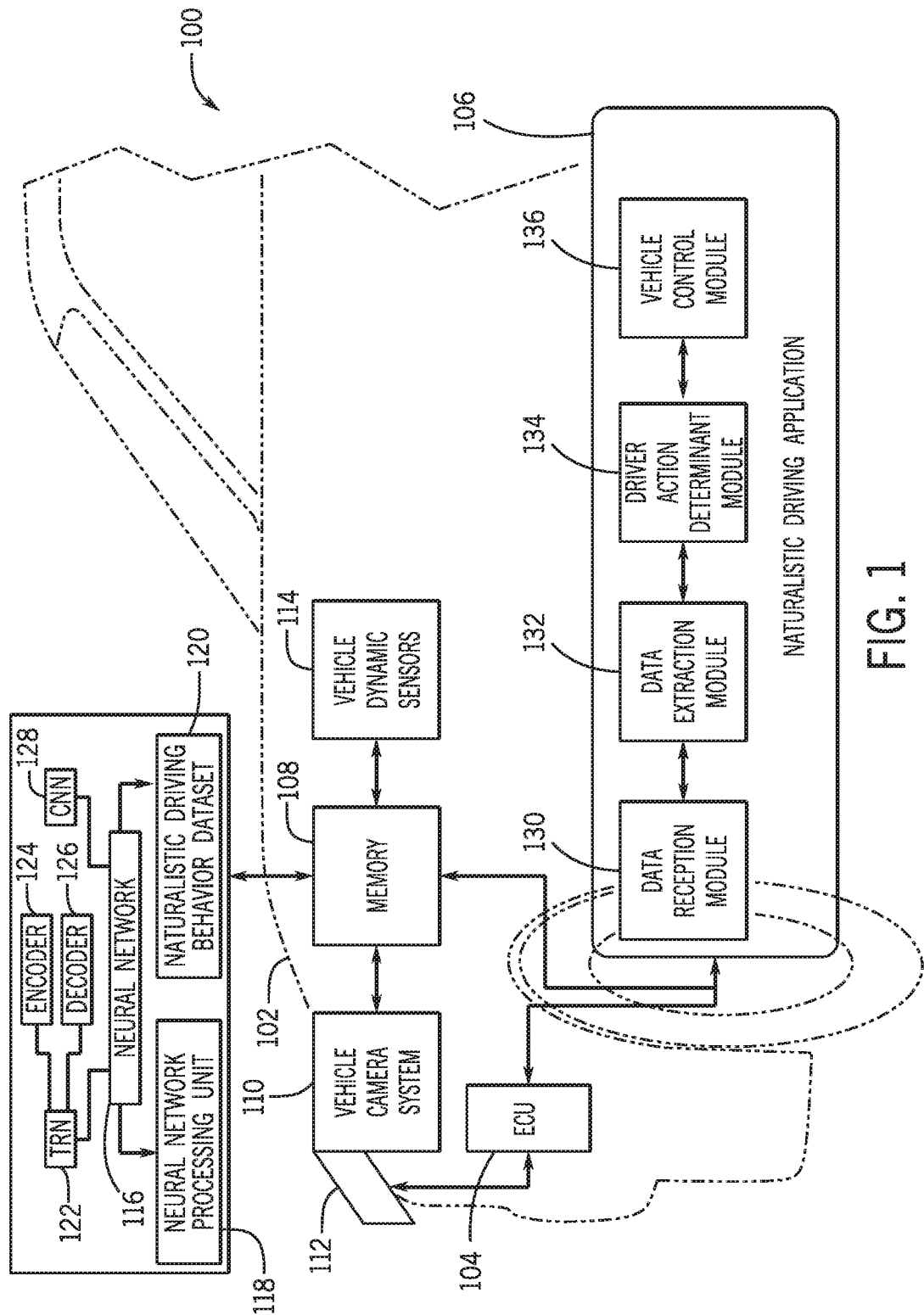
FIG. 1 is a schematic view of an exemplary operating environment for implementing systems and methods for utilizing temporal recurrent networks for online action detection according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for implementing systems and methods for utilizing temporal recurrent networks for online action detection according to an exemplary embodiment of the present disclosure. The components of the environment 100, as well as the components of other systems, hardware architectures, and software architectures discussed herein, can be combined, omitted, or organized into different architectures for various embodiments.

Generally, the environment 100 includes an ego-vehicle (vehicle) 102 with an electronic control unit (ECU) 104 that executes one or more applications, operating systems, vehicle system and subsystem user interfaces, among others. The ECU 104 may also execute a naturalistic driving application 106 that may be configured to understand driver behaviors associated with a driver (not shown) driving the vehicle 102 in various traffic scenes. The application 106 may utilize a neural network 116 that includes a temporal recurrent network (TRN) 122 and a convolutional neural network (CNN) 128. The TRN 122 and the CNN 128 may utilize machine learning/deep learning to provide artificial intelligence capabilities that may be utilized to build and maintain a naturalistic driving behavior data set 120 with annotations associated with a four layer annotation scheme and related data associated with the four layer annotation scheme. The application 106 may process information from various sources provided as inputs and may utilize the neural network 116 to provide various functions, that may include, but may not be limited to computer vision, object classification, feature recognition, multilayer perceptions, and autonomous driving commands.

The naturalistic driving application 106 may utilize the four layer annotation scheme during one or more periods of time that may constitute one or more respective trips of the vehicle 102. The one or more trips of the vehicle 102 may include operation and travel of the vehicle 102 that may be conducted in various locations and to various destinations during one or more periods of time. The four layer annotation scheme may be utilized to include classes of driving processes that include, but may not be limited to, an operational process that corresponds to the manipulation of the vehicle 102, a tactical process that includes interactions between the vehicle 102, traffic participants, and the surrounding environment of the vehicle 102, and a strategic process for higher level reasoning, planning, and decision making.

In an exemplary embodiment, the four layer annotation scheme may include the categorization of one or more behavioral events as goal-oriented actions that may include the driver's manipulation(s) of the vehicle 102 in a navigation task (e.g., right turn) that may be based on an activity that is motivated by a goal (e.g., turning right on a street). As discussed below, a naturalistic driving application 106 may be employ the TRN 122 to execute online action detection (OAD) to process a video stream of an untrimmed video(s) to determine and classify one or more goal-oriented actions.

In particular, the application 106 may be utilized to receive image data and may utilize the TRN 122 to electronically analyze the image data, electronically decode the image data to predict actions in an immediate future point in time as pseudo future information. The immediate future point in time may include a near future (e.g., instant future) point in time of a frame of the video that is received in the form of image data. The actions predicted as pseudo future information may be electronically encoded together with present (e.g., up-to-now) information that is included within the image data and one or more past frames to determine, classify, and annotate one or more goal-oriented actions that are occurring in a current frame. In other words, the naturalistic driving application 106 may utilize the TRN 122 to use predicted pseudo future information while executing OAD to allow the application 106 to utilize past, current, and predicted future information to improve action recognition of a current frame and to determine and classify one or more behavioral events as goal-oriented actions.

The four layer annotation scheme may also include the categorization of one or more behavioral events as stimulus-driven actions (e.g., stopping the vehicle 102) that may be indicative of a reason (due to a driver's reaction to) one or more external stimuli. The four layer annotation scheme may also include a determination of causal reasoning of the one or more behavioral events classified as stimulus-driven actions to explain the reasoning for the behavioral events classified as the stimulus driven actions (e.g., a stopped truck in front of the vehicle 102 is an immediate cause for stopping the vehicle 102).

Additionally, the four layer annotation scheme may include the determination of driver actions associated with one or more attention capturing traffic related objects that may be attended to by the driver during the course of one or more behavioral events classified as stimulus-driven actions (e.g., a pedestrian that may be attended by the driver of the vehicle 102 since the pedestrian might perform certain action that would affect the driver's behavior).

Figure 2:
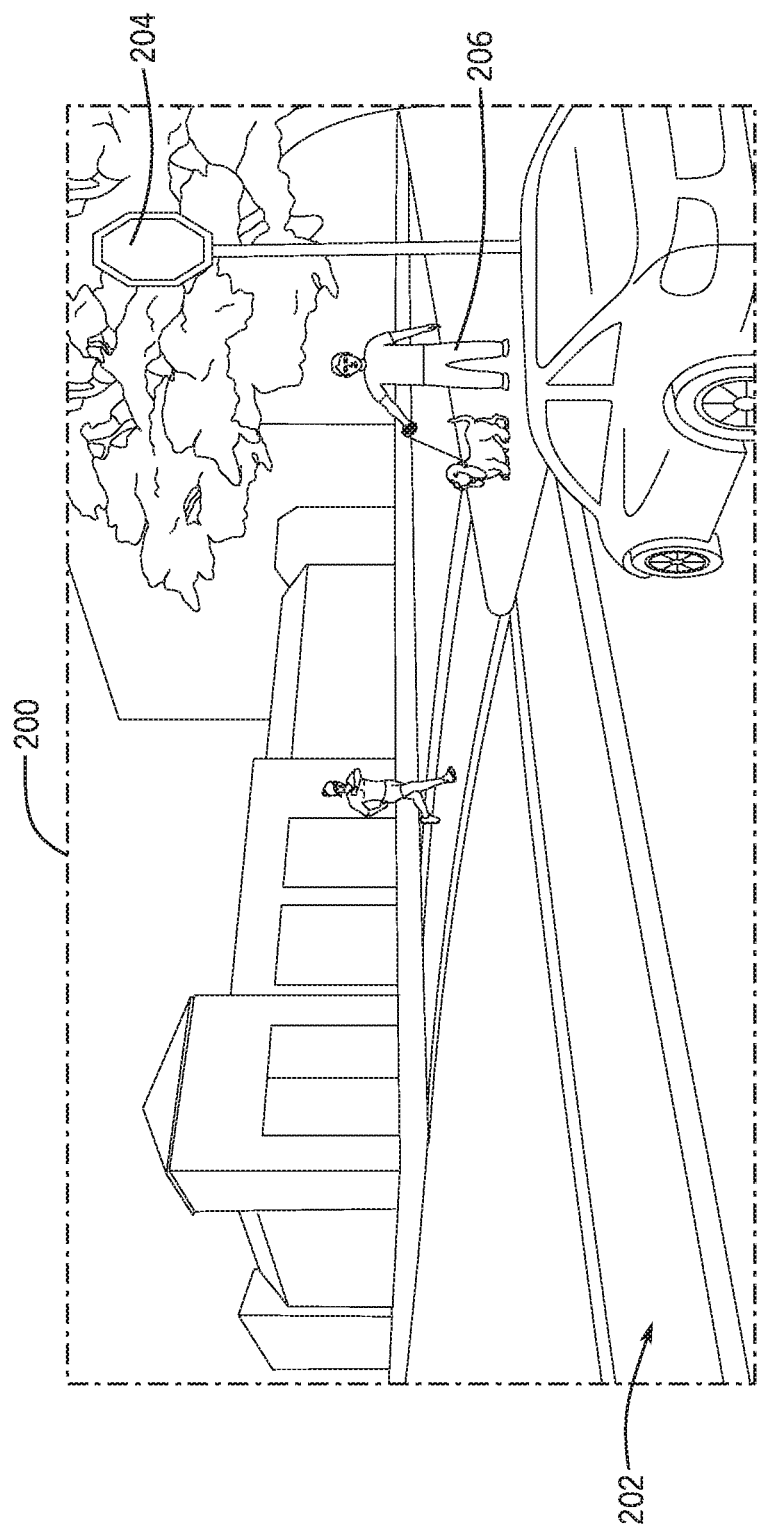
FIG. 2 is an illustrative example of a scene that includes a plurality of exemplary behavioral events that may occur when a vehicle is about to turn right at a traffic intersection and is stopped at the traffic intersection according to an exemplary embodiment of the present disclosure.

FIG. 2 includes an illustrative example of a scene 200 that includes a plurality of exemplary behavioral events that may occur when the vehicle 102 is about to turn right at a traffic intersection 202 and is stopped at the traffic intersection 202 according to an exemplary embodiment of the present disclosure. A goal-oriented action of slowing down the vehicle 102 to make a turn may be determined based on the OAD executed by the TRN 122.

In some embodiments, a stimulus-driven action may be determined as a right turn that is based on feature vectors (discussed below) associated with steering angle data and turn signal data as determined by the CNN 128. A cause associated with the driving maneuver classified as a stimulus driven action may be determined to be a stop sign 204 that may be located at the traffic intersection 202. Furthermore, an attention capturing traffic related object that may be attended by the driver of the vehicle 102 may include a pedestrian 206 that may cross the traffic intersection 202 at which the vehicle 102 is stopped.

Referring again to FIG. 1, the four layer annotation scheme may be based on one or more sources of data associated with the vehicle dynamic information associated with the operation of the vehicle 102 and/or the surrounding (external) environment of the vehicle 102. In some embodiments, additional image data associated with the surrounding environment of the vehicle 102 may be analyzed to determine causal reasoning data that may be used to annotate one or more stimulus-driven actions. In one or more embodiments, the application 106 may also add related data associated with the four layer annotation scheme for each trip of the vehicle 102 to the naturalistic driving behavior data set 120 to be further utilized to control the vehicle 102 to be autonomously driven to provide natural driving behaviors in various traffic scenes.

The four layer annotation scheme may be utilized to detect driver behaviors based on a detection of behavioral events which occur during driving sessions by associating the interactions between human driver behaviors and corresponding traffic scene situations. In one or more configurations, the complete driving scene understanding may enable the application 106 to provide one or more commands to autonomously control the vehicle 102 to be driven in a manner that accounts for one or more goal-oriented actions, behavioral events, the driver's causal reasoning when conducting stimulus-driven actions, and/or the driver's attention to one or more traffic related objects that may influence driving behaviors when conducting the stimulus-driven actions.

With continued reference to FIG. 1, the vehicle 102 may include a plurality of components, for example, a memory 108, a vehicle camera system 110 that is operably connected to one or more cameras 112, and a plurality of vehicle dynamic sensors 114. The ECU 104 and each of the plurality of components of the vehicle 102 discussed above that are operably connected to the ECU 104 will now be discussed in more detail. In an exemplary embodiment, the ECU 104 may be configured to operably control the plurality of components of the vehicle 102. The ECU 104 may additionally provide one or more commands to one or more control units (not shown) of the vehicle 102, including, but not limited to an engine control unit, a braking control unit, a transmission control unit, a steering control unit, and the like to control the vehicle 102 to be autonomously driven.

The autonomous control of the vehicle 102 may be provided to partially control driving of the vehicle 102 during one or more circumstances (e.g., safety controls, driver assist controls), and/or fully to control driving of the vehicle 102 during an entire trip of the vehicle 102. As discussed, the naturalistic driving application 106 may communicate with the ECU 104 to control the vehicle 102 to be autonomously driven in one or more traffic scenes based on the naturalistic driving behavior data set 120.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102. The ECU 104 may also include a communication device (not shown) for sending data internally in the vehicle 102 and communicating with externally hosted computing systems (e.g., external to the vehicle 102). Generally, the ECU 104 communicates with the memory 108 to execute the one or more applications, operating systems, vehicle systems and subsystem user interfaces, and the like that are stored within the memory 108.

The memory 108 may be configured to store one or more executable files associated with one or more operating systems, applications, associated operating system data, application data, vehicle system and subsystem user interface data, and the like that are executed by the ECU 104. In one or more embodiments, the memory 108 of the vehicle 102 may be accessed by the naturalistic driving application 106 to store data, for example, one or more images, videos, and/or vehicle dynamic data associated with the vehicle 102. In some embodiments, the memory 108 may include one or more traffic related object models (not shown) associated with one or more traffic related objects that represent values that include a range of sizes and features (based on image data) that are associated to different types of traffic related objects.

In an exemplary embodiment, the memory 108 may include the neural network 116. The neural network 116 and its included TRN 122 and CNN 128 may process a programming model which enables computer/machine based/deep learning that may be centered on one or more forms of data that are provided to the neural network 116. In addition to being hosted on the memory 108, in some embodiments, the neural network 116 and its included TRN 122 and CNN 128, subsets of the neural network 116, and/or subsets of data may be used by the neural network 116 may be hosted on an externally hosted server infrastructure (not shown) that may be configured to communicate with the ECU 104 of the vehicle 102 through the communication device of the ECU 104.

In one or more embodiments, the neural network 116 may include a neural network processing unit 118 that may provide processing capabilities to be configured to utilize machine learning/deep learning to provide artificial intelligence capabilities that may be utilized to build and maintain the naturalistic driving behavior data set 120 with the four layer annotations scheme. The neural network processing unit 118 may process information that is provided as inputs and may utilize the naturalistic driving behavior data set 120 to access stored computer/machine learned annotations and associated data to provide various functions, that may include, but may not be limited to, object classification, feature recognition, computer vision, speed recognition, machine translation, autonomous driving commands, and the like.

In an exemplary embodiment, the TRN 122 of the neural network 116 may include one or more TRN cells (example shown in FIG. 3) that is configured as an encoder-decoder recurrent neural network that includes an encoder 124 and a decoder 126. The TRN 122 may be configured to receive inputs in the form of the image data of the video streams and may output probabilities of all action candidates for a future frame. As discussed below, the naturalistic driving application 106 may utilize the TRN 122 to determine a plurality of frames from the video to complete feature extraction on each frame associated with image data and output extracted features, $X_t$. Each feature may describe appearance, motion, and may include information in various modalities depending on the driver action. At each time step t, the particular TRN cell of the TRN 122 may receive image data $I_t$ and its hidden state $h_t$ at the previous time step, $(h_{t-1}, h_{t-2}, \ldots h_{t-n})$ as inputs. The TRN cell of the TRN 122 may utilize the neural network processing unit 118 to execute internal processing and output a goal-oriented driver action(s) $p_t$ that is happening at a current time step.

In an exemplary embodiment, the encoder 124 and the decoder 126 may be utilized by each TRN cell. In one embodiment, the decoder 126 of the TRN 122 may be configured to run sequentially with the encoder 124 and complete feature representation of the pseudo future information to output predicted actions and corresponding hidden states. The encoder 124 may be configured to encode one or more spatial-temporal features from one or more frames captured in one or more immediate past points in time. The one or more immediate past points in time may include near past (e.g., instant past) point(s) in time of a frame of the video frame that is received in the form of image data.

Current information associated with a current frame and future information provided by the decoder 126 may also be utilized by the encoder 124 to encode one or more spatial-temporal features from current driving steps and the predicted future steps based on the feature representation of the pseudo future information associated with an immediate future point(s) in time. The TRN 122 may thereby recognize one or more goal-oriented actions from a current frame captured in a present point in time. The present point in time may be a point in time in which the image is captured and instantly analyzed in real-time using OAD. As discussed below, upon the recognition of one or more goal-oriented actions, the naturalistic driving application 106 may annotate and update the naturalistic driving behavior data set 120 with one or more goal-oriented actions.

Figure 3:
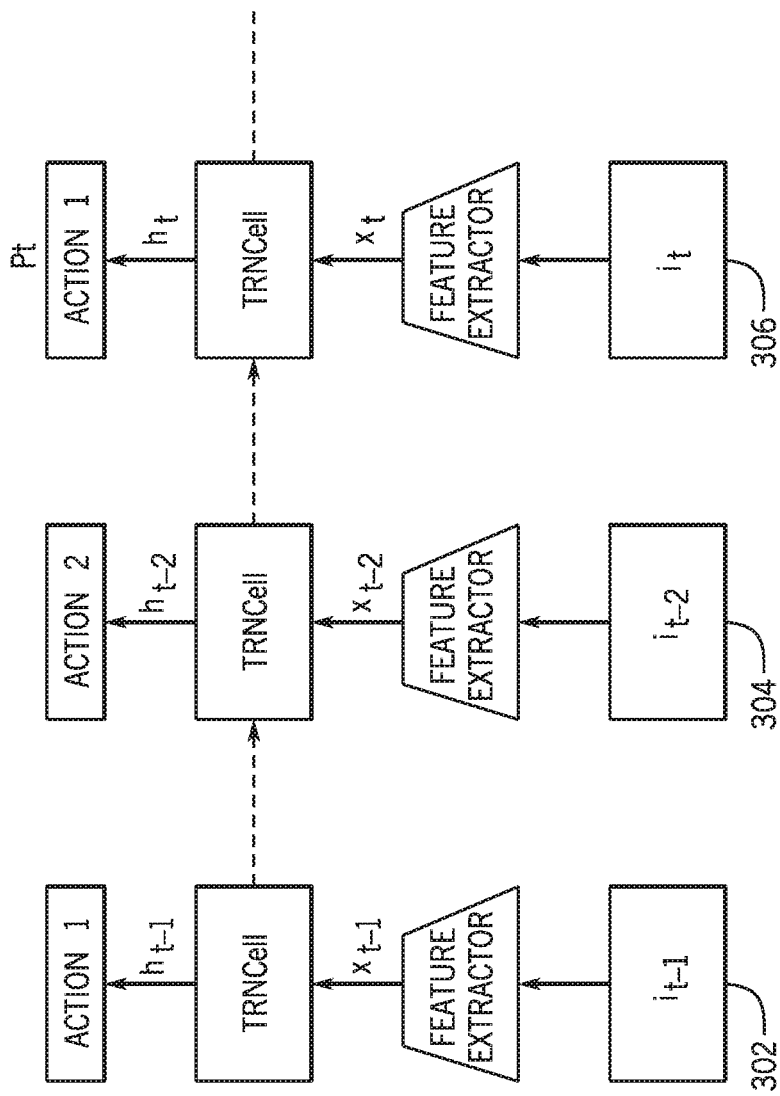
FIG. 3 is an illustrative example of the recognition of one or more goal-oriented actions by a Temporal Recurrent Network according to an exemplary embodiment of the present disclosure.

FIG. 3 includes an illustrative example of the recognition of one or more goal-oriented actions by the TRN 122 according to an exemplary embodiment of the present disclosure. As illustrated, the TRN 122 may be configured to output the goal-oriented driver action $p_t$ occurring at a current frame that includes a current hidden step $h_t$ by extracting features from an evaluating past frame image data inputs $I_{t-1}, I_{t-2}$ corresponding to past image frames 302, 304 and the image data input $I_t$ of a current image frame 306. The TRN 122 may execute numerous TRN Cells and may predict actions using the current hidden step $h_t$ that is utilized by the decoder 126 to predict future steps $h_{t+1}$ (not shown) that are further utilized by the encoder 124 to be encoded with the past steps and the current hidden step to determine and output the goal-oriented driver action $p_t$ occurring at a current frame that include a current hidden step $h_t$.

With reference again to FIG. 1, in one or more embodiments, the neural network processing unit 118 may also be operably connected to a convolutional neural network 128 that may be configured to receive inputs in the form of image data of video streams and may flatten the data and concatenate the data with sensor features provided by the vehicle dynamic sensors 114. The CNN 128 may evaluate sensor values provided by vehicle dynamic sensors 114 of the vehicle 102 (e.g., velocity and yaw rate, turn signal information, steering angle, brake pressure, etc.) and may classify frames using a random forest classifier to detect behavioral events which occur during driving sessions and further classify the behavioral events and associated data that may pertain to one or more stimulus-driven actions, causes, and/or one or more attention capturing traffic related objects that may be attended to by the driver during the course of one or more behavioral events classified as stimulus-driven actions to annotate and update the naturalistic driving behavior data set 120 accordingly. In an alternate embodiment, the CNN 128 may also be configured to evaluate sensor values provided by vehicle dynamic sensors 114 of the vehicle 102 and may classify frames using a random forest classifier to detect goal-oriented actions in addition to the TRN 122 to annotate and update the naturalistic driving behavior data set 120 with one or more goal-oriented actions.

FIG. 4 is an illustrated example of the naturalistic driving behavior data set 400 according to an exemplary embodiment of the present disclosure. In one or more embodiments, the naturalistic driving application 106 may communicate with the neural network processing unit 118 of the neural network 116 to access the naturalistic driving behavior data set 400 to store one or more annotations associated with the four layer annotation data scheme as determined by machine learning/deep learning executed by the TRN 122 and the CNN 128 of the neural network 116. As shown in the illustrative example of FIG. 4, the naturalistic driving behavior data set 400 may include annotations associated with one or more behavioral events that may be classified in real-time by the application 106 as goal-oriented actions 402 and the stimulus-driven actions 404.

The data set 400 may additionally include annotations that are determined as a cause 406 that is associated with one or more behavioral events that are classified as stimulus-driven actions 404. Additionally, the data set 400 may include annotations that are determined as attention capturing traffic related object(s) (shown as attention) 408 that may include one or more traffic related objects that may capture the attention of the driver during one or more behavioral events classified as stimulus-driven actions 404 occur during each trip of the vehicle 102. The annotations and related data may be determined in real-time during each trip of the vehicle 102 and may be added to the naturalistic driving behavior data set 120 to be utilized to autonomously control the vehicle 102 during the respective trip of the vehicle 102 and subsequent trips of the vehicle 102.

As discussed below, the naturalistic driving application 106 may utilize the TRN 122 and the CNN 128 to classify the one or more behavioral events as the goal-oriented action 402 or the stimulus-driven action 404 to add underlying annotations and related data to the naturalistic driving behavior data set 120 (e.g., to train the neural network 116). Additionally, such data may be utilized by the application 106 to determine the cause 406 associated with the one or more behavioral events classified as stimulus-driven actions. The application 106 may thereby add respective annotations and related data attributed to the cause 406 to the naturalistic driving behavior data set 400. Image data may also be used to determine the one or more attention capturing traffic related objects 408 associated with the one or more behavioral events classified as stimulus-driven actions that may influence driving behaviors of the driver when conducting the one or more driving maneuvers. Accordingly, respective annotations and related data may be added to the naturalistic driving behavior data set 400 that are attributed to the attention capturing traffic related objects 408.

Referring again to FIG. 1, the vehicle camera system 110 may include one or more cameras 112 that are positioned at one or more exterior and interior portions of the vehicle 102. The camera(s) 112 may be positioned in a direction to capture the surrounding environment of the vehicle 102. In an exemplary embodiment, the surrounding environment of the vehicle 102 may be defined as a predetermined area located in around (front/sides/behind) the vehicle 102 (e.g., road environment in front, sides, and/or behind of the vehicle 102) that may be included within the vehicle's travel path.

The one or more cameras 112 of the vehicle camera system 110 may be disposed at external front and/or side portions of the vehicle 102, including, but not limited to different portions of the vehicle bumper, vehicle front lighting units, vehicle fenders, and the windshield. In one configuration, the one or more cameras may include an artificial vision sensor to view a roadway ahead of the vehicle 102. The one or more cameras may be positioned on a planar sweep pedestal (not shown) that allows the one or more cameras to be oscillated to capture images of the external environment of the vehicle 102 at various angles.

The one or more cameras 112 may provide images/video of the surrounding environment of the vehicle 102. As discussed below, the naturalistic driving application 106 may execute image logic to determine the image data. The application 106 may additionally execute the image logic to perform feature extraction extract on the image(s). The image extraction may include the extraction of one or more spatial-temporal features and may pertain to object and scene recognition. In one embodiment, the image logic may also be utilized to determine one or more sets of image coordinates associated with one or more objects that may include, but may not be limited to, traffic participants (e.g., pedestrians, bikers, other vehicles), roadway attributes (e.g., lane markings, off-ramps, curbs), and road side objects (e.g., traffic light, stop sign).

In one or more embodiments, the vehicle dynamic sensors 114 may be included as part of a Controller Area network bus (CAN bus) of the vehicle 102 and may be configured to provide vehicle dynamic data to the ECU 104, one or more vehicle systems (not shown), and to the naturalistic driving application 106. The vehicle dynamic sensors 114 may include, but may not be limited to, velocity sensors, steering speed sensors, steering angle sensors, throttle angle sensors, accelerometers, magnetometers, gyroscopes, brake force sensors, wheel speed sensors, wheel turning angle sensors, yaw rate sensors, transmission gear sensors, temperature sensors, RPM sensors, GPS/DGPS sensors, signal enablement sensors, lighting enablement sensors, and the like (individual sensors not shown).

The vehicle dynamic sensors 114 may provide one or more values (e.g., numeric levels) that are associated with the real-time dynamic performance of the vehicle 102 as the driver conducts one or more driving maneuvers and/or as the vehicle 102 is controlled to be autonomously driven. In particular, the vehicle dynamic sensors 114 may sense and output driver operational inputs that may include, but may not be limited to, steering angle, steering speed, acceleration pedal angle, brake pedal angle, brake pressure, transmission gear shifts, turn signal enablement, and the like. Additionally, the vehicle dynamic sensors 114 may provide vehicular motion operational inputs that may include, but may not be limited to, velocity and yaw rate associated with the movement of the vehicle 102. As discussed below, sensor data provided by the vehicle dynamic sensors 114 may be utilized to provide behavioral event detection that is used to classify and annotate one or more driving behaviors.

II. The Naturalistic Driving Application and Related Methods

The components of the naturalistic driving application 106 will now be described according to an exemplary embodiment and with reference to FIG. 1. In an exemplary embodiment, the naturalistic driving application 106 may be stored on the memory 108 and executed by the ECU 104 of the vehicle 102. In another embodiment, the naturalistic driving application 106 may be stored on the externally hosted computing infrastructure and may be accessed by the communication device of the ECU 104 to be executed by the ECU 104 of the vehicle 102.

The general functionality of the naturalistic driving application 106 will now be discussed. In an exemplary embodiment, the naturalistic driving application 106 may include a data reception module 130, a data extraction module 132, a driver action determinant module 134, and a vehicle control module 136. Methods and examples describing process steps that are executed by the modules 130-136 of the naturalistic driving application 106 will now be described in more detail.

Figure 5:
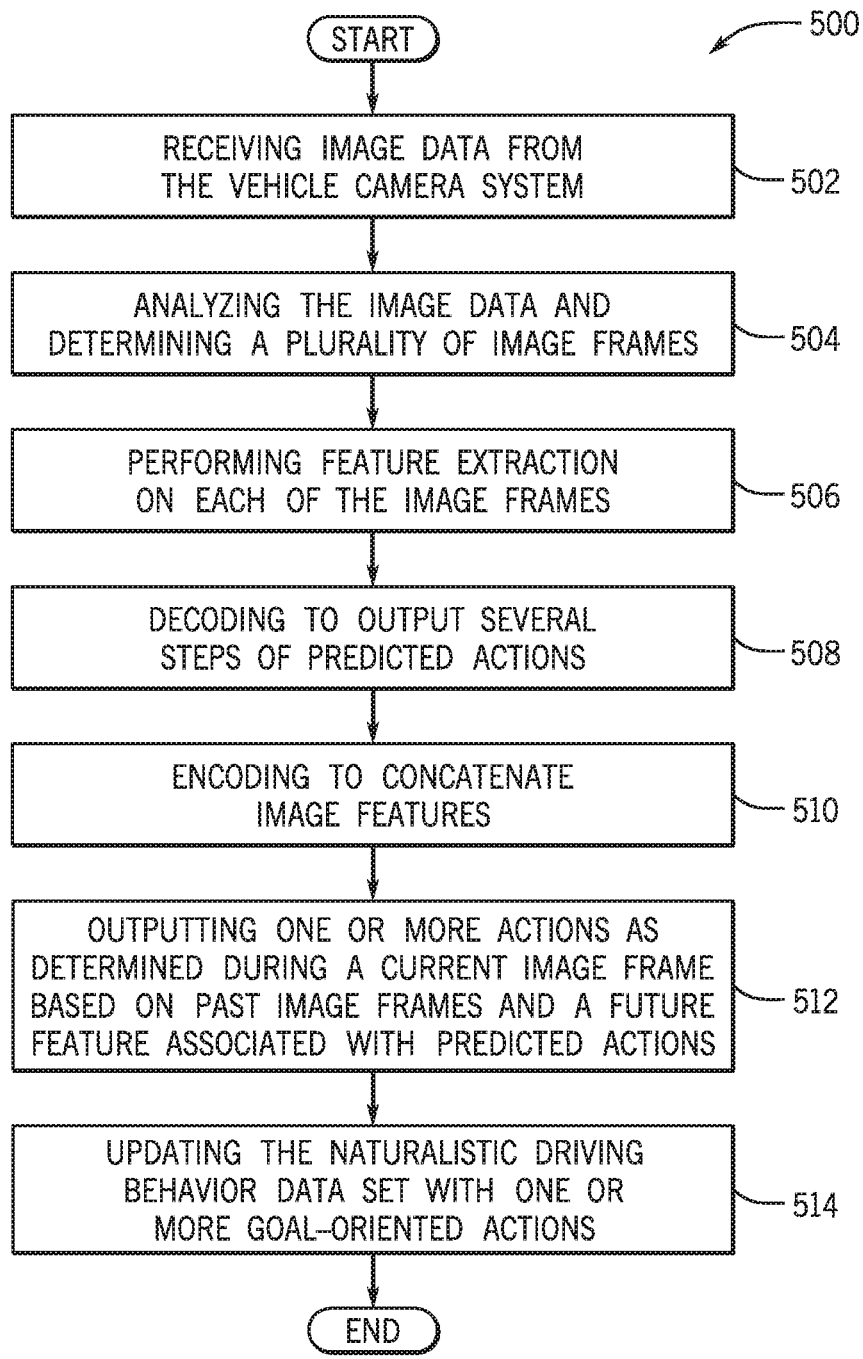
FIG. 5 is a process flow diagram of a method for using the temporal recurrent network for online action detection to determine and classify one or more goal-oriented actions according to an exemplary embodiment of the present disclosure.

FIG. 5 is a process flow diagram of a method 500 for using the temporal recurrent network for online action detection to determine and classify one or more goal-oriented actions according to an exemplary embodiment of the present disclosure. FIG. 5 will be described with reference to the components of FIG. 1, though it is to be appreciated that the method 500 of FIG. 5 may be used with other systems/components.

The method 500 may begin at block 502, wherein the method 500 may include receiving image data from the vehicle camera system 110. In an exemplary embodiment, the data reception module 130 may communicate with the vehicle camera system 110 to collect image data that includes data pertaining to video of the surrounding environment of the vehicle 102. In one embodiment, the data reception module 130 may package and store the image data on the memory 108. As discussed, the image data may be utilized to further classify one or more behavioral events.

The method 500 may proceed to block 504, wherein the method 500 may include analyzing the image data and determining a plurality of image frames. In an exemplary embodiment, the data reception module 130 may utilize image logic to evaluate the image data and may utilize the CNN 128 to execute machine learning/deep learning to down sample the image data by lowering its sampling rate or same size. The down sampling may allow the bit rate to be decreased to more efficiently process the image data.

In one or more embodiments, the data extraction module 132 may send one or more commands to the CNN 128 to convert the down sampled data into a plurality of image frames that may include one or more past image frames of image(s) (from video) that include one or more immediate past points in time from a current point in time to determine image data inputs $I_{t-1}$, $I_{t-2}$, etc., of past image frames. The one or more immediate past points in time may include near past (e.g., instant past) point(s) in time of a current point in time that is received in the form of image data. The data reception module 130 may also be configured to determine an image frame that includes a current image frame to determine image data input $I_t$ of the current image frame.

The method 500 may proceed to block 506, wherein the method 500 may include performing feature extraction on each of the image frames. In an exemplary embodiment, the data reception module 130 may communicate data pertaining to the plurality of image frames determined based on the analysis of image data (completed at block 504) to the data extraction module 132. The data extraction module 132 may be configured to evaluate the image data inputs of past image frames and image data inputs of the current image frame and may be configured to perform feature extraction to extract feature vectors associated with spatial-temporal features. In other words, the data extraction module 132 may perform as a feature extractor that is utilized to extract feature vectors associated with spatial-temporal features (e.g., $x_t$, $x_{t-1}$, $x_{t-2}$).

In one embodiment, the data extraction module 132 may utilize the CNN 128 to execute machine learning to extract the feature vectors that may describe appearance, motion, and in some circumstances may contain information in another modality depending on the task. It is to be appreciated that such feature extraction may be completed by the data extraction module 132 at one or more of the additional process steps (at blocks 508-512) that may be used to determine and classify one or more goal-oriented actions.

The method 500 may proceed to block 508, wherein the method 500 may include decoding to output several steps of predicted actions. In one embodiment, upon the extraction of one or more spatial-temporal features from the past image frames and the current image frame, the data extraction module 132 communicates respective data to the driver action determinant module 134. The driver action determinant module 134 may be configured to communicate with the TRN 122 to utilize the decoder 126 to output several steps of predicted actions based on a feature representation of future information that is predicted to occur at an immediate future point in time as pseudo future information. The immediate future point in time may include a near future (e.g., instant future) point in time of the video frame that is received in the form of image data.

In one embodiment, the decoder 126 of the TRN 122 may run sequentially to output several steps of predicted actions and corresponding hidden states $[eh^0_t, eh^1_t, \ldots eh^N_t]$ where $eh^i_t$ indicates the decoder's hidden state at the next ith step starting from time t. A future representation of a predicted action, $f_t$ is obtained by average pooling all the hidden states based on the feature vectors extracted from the past image frame(s) and the current image frame. The TRN 122 thereby outputs actions at one or more immediate next several steps by the decoder 126 based on the future representation of predicted actions.

The method 500 may proceed to block 510, wherein the method 500 may include encoding to concatenate image features. In one embodiment, the encoder 124 of the TRN 122 concatenates the image features (feature vectors) extracted from the past hidden states, $h_{t-1}$, $h_{t-2}$, from the past frame image data inputs $I_{t-1}$, $I_{t-2}$, with the image features (feature vectors), $x_t$ extracted from $I_t$, the image data input of a current image frame, and with a future feature associated with the future representation of a prediction action, $f_t$ obtained from the decoder 126 of the TRN 122 (at block 508).

The method 500 may proceed to block 512, wherein the method 500 may include outputting one or more actions as determined during a current image frame based on the past image frames, the current image frame, and the future feature associated with predicted actions. In one embodiment, the TRN 122 may complete internal processing and output $p_t=[p^1_t, p^2_t \ldots p^K_t]$, where the subscript t indicates the tth step, M is the maximum length of image frames and K indicates a number of action classes. In other words, the TRN 122 progressively takes image sequences as input and outputs the probabilities of all action candidates for the current frame based on the concatenation of image features (feature vectors) extracted from the past hidden states, $h_{t-1}$, $h_{t-2}$, the image features (feature vectors), $x_t$ extracted from $I_t$, the image data input of a current image frame, and the future feature associated with the future representation of a prediction action, $f_t$.

The outputting of $p_t$ is utilized by the driver action determinant module 134 to evaluate the driving scene using ground truth labels to determine one or more driver actions that are conducted absent any external stimuli that is present within the surrounding environment of the vehicle 102. The driver action determinant module 134 may thereby determine and classify one or more goal-oriented actions that take place in a current frame (e.g., in real-time) based on the utilization of the TRN 122 for performing OAD.

The method 500 may proceed to block 514, wherein the method 500 may include updating the naturalistic driving behavior data set with annotations associated with one or more goal-oriented actions. In an exemplary embodiment, upon determining and classifying the one or more goal-oriented actions based on utilizing the TRN 122 for performing OAD, the driver action determinant module 134 may communicate with the neural network processing unit 118 to access the naturalistic driving behavior data set 120 stored on the memory 108 of the vehicle 102.

In one embodiment, the driver action determinant module 134 may add one or more annotations associated with the goal-oriented actions to the naturalistic driving behavior data set 120. The driver action determinant module 134 may additionally add related data associated with the one or more actions classified as the goal-oriented actions. The related data may include, but may not be limited to, vehicle dynamic data captured during a current point in time by the vehicle dynamic sensors 114, traffic related object location data, and/or additional image data associated with the goal-oriented action(s).

In an additional embodiment, the one or more annotations may be manually added to the naturalistic driving behavior data set 120 by a plurality of independent human annotators using open source software (e.g., ELAN²) after manual evaluation of the one or more goal-oriented actions that take place in the current frame and are determined based on the utilization of the TRN 122 for performing OAD. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

In one or more embodiments, the driver action determinant module 134 may evaluate the naturalistic driving behavior data set 120 to determine if one or more annotations that describe classified goal-oriented actions have been previously added to the data set 120. If it is determined that one or more goal-oriented actions have been previously added to the data set 120, the driver action determinant module 134 may annotate a number of instances of each classified goal-oriented action that have been classified over a predetermined period of time (e.g., 180 days). Additionally, the driver action determinant module 134 may annotate an average duration of each respective goal-oriented action.

As shown in the illustrative example of FIG. 4, the naturalistic driving behavior data set 400 may include annotations associated with respective driving maneuvers classified as the goal-oriented action 402. Additionally, the naturalistic driving behavior data set 400 may include annotations associated with the number of instances of the goal-oriented actions and the average duration of the goal-oriented actions 402 that have been classified over a predetermined period of time. It is to be appreciated that the naturalistic driving behavior data set 120 may be annotated with related data that is associated with the context of one or more driving maneuvers classified as the goal-oriented actions.

Figure 6:
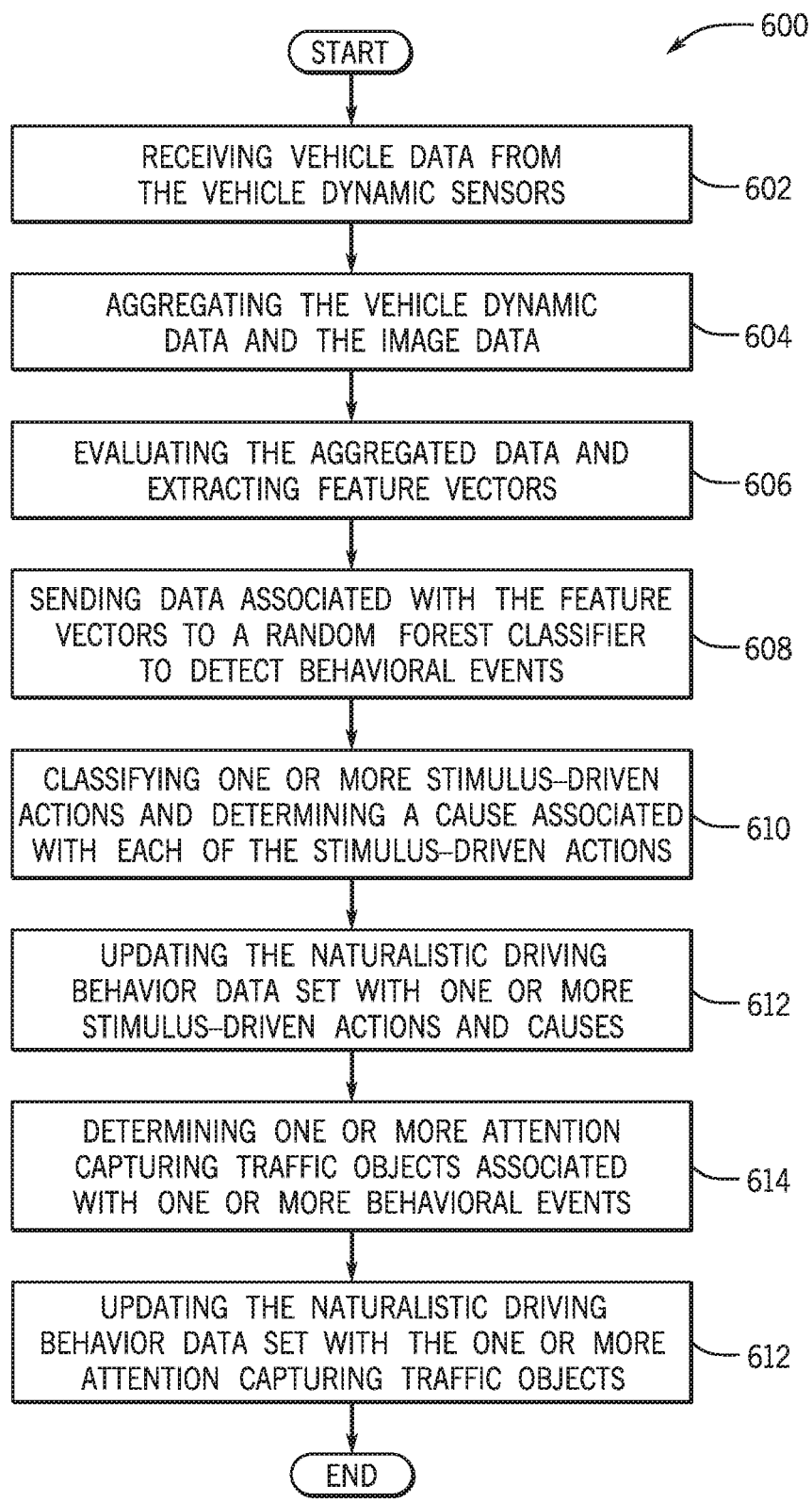
FIG. 6 is a process flow diagram of a method for determining stimulus-driven actions, causes, and attention-capturing traffic objects according to an exemplary embodiment of the present disclosure.

FIG. 6 is a process flow diagram of a method 600 for determining stimulus-driven actions, causes, and attention-capturing traffic objects according to an exemplary embodiment of the present disclosure. FIG. 6 will be described with reference to the components of FIG. 1, though it is to be appreciated that the method of FIG. 6 may be used with other systems/components. The method 600 may begin at block 602, wherein the method 600 may include receiving vehicle data from the vehicle dynamic sensors 114.

In an exemplary embodiment, the data reception module 130 of the naturalistic driving application 106 may communicate with the vehicle dynamic sensors 114 of the vehicle 102 to collect the vehicle dynamic data (e.g., sensor inputs). In particular, the vehicle dynamic data may include driver operational inputs that may include, but may not be limited to, steering angle data, steering speed data, acceleration pedal angle data, brake pedal angle data, brake pressure data, transmission gear shift data, turn signal enablement data, brake force data, throttle angle data, vehicle acceleration data, wheel speed data, temperature data, RPM data, GPS/DGPS data, and the like. Additionally, the vehicle dynamic data may include vehicular motion operational inputs that may include, but may not be limited to, velocity data and yaw rate data.

In one embodiment, the data reception module 130 may collect the vehicle dynamic data for each trip of the vehicle 102. The data reception module 130 may package and store the vehicle dynamic data on the memory 108 as a data package (vehicle trip dynamic data) (not shown) that is associated with the respective trip of the vehicle 102. In particular, the vehicle trip dynamic data may be associated with a timeframe of data collection (e.g., a start point/time, end point/time, and duration/timeframe of the respective trip of the vehicle 102) to be utilized to further classify and annotate the behavioral events during the trip of the vehicle 102. In one embodiment, upon receiving the vehicle dynamic data, the data reception module 130 may communicate the vehicle dynamic data to the data extraction module 132.

The method 600 may proceed to block 604, wherein the method 600 may include aggregating the vehicle dynamic data and the image data. In an exemplary embodiment, the data extraction module 132 may communicate with the neural network processing unit 118 to utilize one or more machine learning/deep learning fusion processes to aggregate the vehicle dynamic data and the image data stored on the memory 108 by the data reception module 130 (as discussed above with reference to block 502).

The method 600 may proceed to block 606, wherein the method 600 may include evaluating the aggregated data and extracting feature vectors. In an exemplary embodiment, the data extraction module 132 may utilize the CNN 128 to evaluate the aggregated data and classify a plurality of frames associated with the vehicle dynamic data based on the aggregated vehicle dynamic data and image data. In particular, the CNN 128 may execute machine learning/deep learning and may down sample the aggregated sensor inputs (e.g., aggregated vehicle dynamic data and image data) by lowering its sampling rate or sample size (e.g. down sampled to 5 Hz bits per sample). The down sampling may allow the bit rate to be decreased to more efficiently process the aggregated data.

In one or more embodiments, the data extraction module 132 may send one or more commands to the CNN 128 to convert the down sampled data into a plurality of frames (e.g., data frames). Each of the plurality of frames may include aggregated data that pertains to a particular type of sensor input provided by a particular sensor of the vehicle dynamic sensors 114. For example, the plurality of frames may include aggregated data that pertains to a steering angle data provided by steering angle sensors that are analyzed with respect to aggregated data.

In an exemplary embodiment, the CNN 128 may execute machine learning/deep learning to extract feature vectors from an N second context window. The CNN 128 may extract the feature vectors associated with each particular sensor input provided by each particular sensor of the vehicle dynamic sensors 114. The feature vectors may be extracted from each frame of the plurality of frames associated with the aggregated data. The plurality of frames may include a frame that is classified as a target frame that includes mean sensor inputs in the middle of a plurality of frames. For example, the CNN 128 may extract feature vectors associated with each particular sensor input of the driver operational inputs and the vehicular motion operational inputs as received by the data reception module 130 (at block 602) for five frames that include a third frame that is associated with a current image frame that is also evaluated by the TRN 122 to determine and classify and goal-oriented driver action(s) and may classify the current frame as a target frame.

In one embodiment, the data extraction module 132 may utilize the neural network processing unit 118 to extract a plurality of feature vectors associated with each sensor input. More specifically, for each sensor input, the neural network processing unit 118 may output a plurality of feature vectors associated with the frames that may include, but may not be limited to, a value of the target frame, a maximum value of the respective sensor input, a minimum value of the respective sensor input, an average value of the respective sensor input, and a slope of the values within the N second context time window. In some embodiments, the neural network processing unit 118 may utilize different sliding window sizes to output different feature vectors. For example, different feature vectors may be obtained through a sliding window with a 200-msec frame shift.

The method 600 may proceed to block 608, wherein the method 600 may include sending data associated with the feature vectors to a random forest classifier to detect behavioral events. In one embodiment, the CNN 128 may send feature vectors associated with each sensor input of a plurality of frames to a random forest classifier. The random forest classifier may be utilized to classify and detect one or more predefined behavioral events from the one or more frames of aggregated data. The CNN 128 may apply the random forest classifier as a data classifier to determine if each context window has one or more objects at varying scales pertaining to each data frame to thereby detect and classify one or more predefined behavioral events and one or more background events.

In one embodiment, the neural network processing unit 118 may utilize the random forest classifier to classify one or more feature vectors from the target frame of the plurality of frames (e.g., third frame of five frames per second) of the each sensor input, image data, and associated confidence score (included within the aggregated data) into a predefined behavioral event that is determined from a list of predetermined driving behaviors stored on the naturalistic driving behavior data set 120. In an exemplary embodiment, upon detecting one or more behavioral events based on the utilization of the random forest classifier, the CNN 128 and/or the neural network processing unit 118 may communicate respective data to the data extraction module 132. The data extraction module 132 may be configured to communicate respective data to the driver action determinant module 134 of the naturalistic driving application 106.

The method 600 may proceed to block 610, wherein the method 600 may include classifying one or more stimulus-driven actions and determining a cause associated with each of the stimulus-driven actions. In an exemplary embodiment, the driver action determinant module 134 may communicate with the CNN 128 to evaluate one or more characteristics associated with one or more behavioral events to determine stimulus-driven behavioral events. In particular, the driver action determinant module 134 may evaluate the one or more driving behavioral events and associated image data that pertains to one or more traffic related objects that may be located within a travel path of the vehicle 102 to determine a driving scene of the vehicle 102 that is associated with each of the one or more detected behavioral events. The driving scene of the vehicle 102 may include attributes associated with the surrounding environment of the vehicle 102 as a respective driving maneuver associated with one or more respective behavioral events is conducted.

Additionally, the driving scene may include the classifications, characteristics, locations, ranges, and positions of one or more traffic related objects that are located within the surrounding environment of the vehicle 102 (with respect to the vehicle 102) as one or more respective behavioral events occur. The driver action determinant module 134 may thereafter evaluate the driving scene to determine the context of one or more behavioral events if the one or more behavioral events occur due to external stimuli that is present within the surrounding environment of the vehicle 102.

In particular, the driver action determinant module 134 may evaluate each detected behavioral event and traffic related object characteristics (e.g., traffic light state, position, location, and range of objects, speed of the vehicle, steering angle, braking force, etc.) to determine external stimuli that is a (partial or full) cause of the one or more behavioral events. Based on the determination of the external stimuli that is a cause of the behavioral event(s) from the evaluation of the driving scene, the driver action determinant module 134 may classify one or more of the behavioral events as stimulus-driven actions.

The method 600 may proceed to block 612, wherein the method 600 may include updating the naturalistic driving behavior data set 120 with annotations associated with one or more stimulus-driven actions and causes. In an exemplary embodiment, upon classifying the one or more behavioral events as the stimulus-driven actions, the driver action determinant module 134 may communicate with the neural network processing unit 118 to access the naturalistic driving behavior data set 120 stored on the memory 108 of the vehicle 102.

In one configuration, the driver action determinant module 134 may add one or more annotations that describe the one or more driving behavioral events classified as stimulus-driven actions to the naturalistic driving behavior data set 120. The driver action determinant module 134 may additionally add related data associated with the one or more behavioral events classified as the stimulus-driven actions. The related data may include, but may not be limited to, vehicle dynamic data, traffic related data, object location data, and/or additional image data associated with the stimulus-driven action(s).

With reference to FIG. 1, in one or more embodiments, the driver action determinant module 134 may evaluate the naturalistic driving behavior data set 120 to determine if one or more annotations that describe the one or more behavioral events classified as stimulus-driven actions have been previously added to the data set 120. If it is determined that one or more driving maneuvers classified as stimulus-driven actions have been previously added to the data set 120, the driver action determinant module 134 may annotate a number of instances of each respective driving maneuver classified as a stimulus-driven actions that have been classified over a predetermined period of time (e.g., 180 days). Additionally, the driver action determinant module 134 may annotate an average duration of each respective behavioral event classified as a stimulus-driven action.

As shown in the illustrative example of FIG. 4, the naturalistic driving behavior data set 400 may include annotations associated with respective driving maneuvers classified as the stimulus-driven action 404. Additionally, the naturalistic driving behavior data set 400 may include annotations associated with the number of instances of the stimulus-driven actions 404 and the average duration of the stimulus-driven actions 404. It is to be appreciated that the naturalistic driving behavior data set may be annotated with related data that is associated with the context of one or more driving maneuvers classified as the stimulus-driven actions 404.

In one embodiment, the driver action determinant module 134 may additionally evaluate the driving scene to determine the external stimuli that is present within the surrounding environment of the vehicle 102 as the cause of the one or more behavioral events classified as stimulus-driven action(s). In an exemplary embodiment, upon determining the causal relationship between the external stimuli and the stimulus-driven action(s), the driver action determinant module 134 may communicate with the neural network processing unit 118 to access the naturalistic driving behavior data set 120 stored on the memory 108 of the vehicle 102.

In one embodiment, the driver action determinant module 134 may add one or more annotations that describe one or more causes associated with the stimulus-driven actions to the naturalistic driving behavior data set 120. The one or more annotations may be added with related data that includes an identifier that identifies and links the causal relationship between each cause and each stimulus-driven action. Additional related data that may be added to the naturalistic driving behavior data set 120, may include, but may not be limited to data associated with the cause (e.g., type of traffic related object), vehicle location, location, position, and range of traffic related object(s), and/or additional image data associated with the stimulus-driven action(s).

With continued reference to FIG. 1, in one or more embodiments, the driver action determinant module 134 may evaluate the naturalistic driving behavior data set 120 to determine if one or more annotations associated with cause(s) of the stimulus-driven action(s) have been previously added to the data set 120. If it is determined that the one or more annotations have been previously added to the data set 120, the driver action determinant module 134 may annotate a number of instances of each respective cause that have been determined over a predetermined period of time (e.g., 180 days). Additionally, the driver action determinant module 134 may annotate an average duration of each respective external stimuli determined to be a cause of each stimulus-driven action.

As shown in the illustrative example of FIG. 4, the naturalistic driving behavior data set 400 may include annotations associated with the cause 406 associated with each of the stimulus-driven actions 404. Additionally, the naturalistic driving behavior data set 400 may include annotations associated with the number of instances of the cause 406 and the average duration of the cause 406. It is to be appreciated that the naturalistic driving behavior data set 120 may additionally be annotated with related data (e.g., location, position, range, characteristics of the cause) and indications that link each cause 406 to a stimulus-driven action 404.

In an additional embodiment, the one or more annotations pertaining to the stimulus-driven actions and/or the causes may be manually added to the naturalistic driving behavior data set 120 by a plurality of independent human annotators using open source software after manual evaluation of image data (e.g., videos) and vehicle dynamic data. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

The method 600 may proceed to block 614, wherein the method 600 may include determining one or more attention capturing traffic objects associated with one or more behavioral events. In one embodiment, the driver action determinant module 134 may evaluate each detected behavioral event that is classified as the stimulus-driven event and may further analyze traffic related object characteristics (e.g., traffic light state, position, location, and range of objects, speed of the vehicle, yaw rate, steering angle, braking force, etc.) to determine one or more traffic related objects that may be located within a travel path of the vehicle 102 (e.g., part of the roadway, on the roadway, on the side of the roadway) that may indicate one or more sensor inputs associated with one or more behavioral events (e.g., steering angle data that indicates the behavioral event of swerving). The CNN 128 may thereafter classify the one or more traffic related objects as attention capturing traffic objects associated with one or more behavioral events classified as stimulus-driven events.

The method 600 may proceed to block 616, wherein the method 600 may include updating the naturalistic driving behavior data set 120 with the one or more attention capturing traffic related objects. In an exemplary embodiment, upon determining the one or more attention capturing traffic related objects associated with one or more behavioral events, the driver action determinant module 134 may communicate with the neural network processing unit 118 to access the naturalistic driving behavior data set 120 stored on the memory 108 of the vehicle 102. In one embodiment, the driver action determinant module 134 may add related data associated with one or more attention capturing traffic related objects to the naturalistic driving behavior data set 120 that may include, but may not be limited to, characteristics of each of the attention capturing traffic related objects, position, range, and location of each of the attention capturing traffic related objects, vehicle dynamic data, image data, and the like.

In an additional embodiment, the one or more annotations may be manually added to the naturalistic driving behavior data set 120 by a plurality of independent human annotators using open source software after manual evaluation of image data and the one or more behavioral events communicated by the data extraction module 132. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

In one or more embodiments, the driver action determinant module 134 may evaluate the naturalistic driving behavior data set 120 to determine if one or more annotations that describe the one or more attention capturing traffic related objects have been previously added to the data set 120. If it is determined that one or more attention capturing traffic related objects have been previously added to the data set 120, the driver action determinant module 134 may annotate a number of instances of each respective action capturing traffic related object that has been determined over a predetermined period of time (e.g., 180 days). Additionally, the driver action determinant module 134 may annotate an average duration of time each respective attention capturing traffic related objects may capture the attention of the driver.

As shown in the illustrative example of FIG. 4, the naturalistic driving behavior data set 400 may include annotations associated with each respective attention capturing traffic related object as an attention capturing traffic related object(s) (shown as attention). The driver action determinant module 134 may annotate an average duration of time with respect to each respective attention capturing traffic related object 408 that may capture the attention of the driver. The naturalistic driving behavior data set 120 may be annotated with additional information that includes the respective positions/locations of each respective attention capturing traffic related objects with respect to the vehicle 102.

Figure 7:
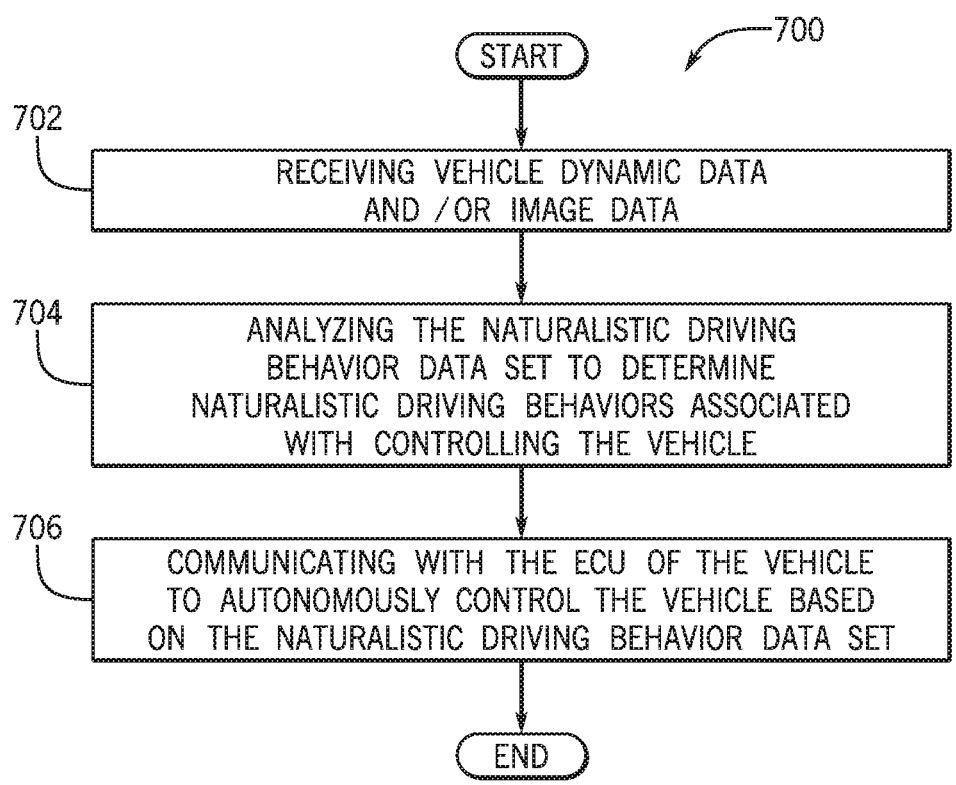
FIG. 7 is a process flow diagram of a method for controlling the vehicle to be autonomously driven based on the naturalistic driving behavior data set according to an exemplary embodiment of the present disclosure.

FIG. 7 is a process flow diagram of a method 700 for controlling the vehicle 102 to be autonomously driven based on the naturalistic driving behavior data set 120 according to an exemplary embodiment of the present disclosure. FIG. 7 will be described with reference to the components of FIG. 1, though it is to be appreciated that the method of FIG. 7 may be used with other systems/components. The method 700 may begin at block 702, wherein the method 700 may include receiving vehicle dynamic data and/or image data.

In an exemplary embodiment, if the vehicle 102 is set to be partially or fully autonomously driven (e.g., by the driver of the vehicle 102 actuating one or more safety features, an occupant actuating full autonomous driving control of the vehicle 102, and/or by the ECU 104), the ECU 104 may communicate with the vehicle dynamic sensors 114 and/or the vehicle camera system 110 to receive the vehicle dynamic data and/or image data. Upon receiving the vehicle dynamic data and/or image data, the ECU 104 may communicate the respective data to the vehicle control module 136 of the naturalistic driving application 106.

In one embodiment, the vehicle control module 136 may process the vehicle dynamic data to determine vehicle speed data, steering speed data, steering angle data, throttle angle data, vehicle acceleration data, brake force data, wheel speed data, wheel turning angle data, yaw rate data, transmission gear data, temperature data, RPM data, GPS/DGPS data, and the like that is applicable to the current operation of the vehicle 102.

In some configurations, the vehicle control module 136 may additionally process the image data to determine the location, range, and position of the one or more traffic related objects with respect to the current location of the vehicle 102 and the travel path of the vehicle 102. The vehicle control module 136 may analyze the vehicle dynamic data and image data, to determine one or more driving scene scenarios and the one or more traffic related objects that may affect the operation of the vehicle 102 when traveling within the surrounding environment of the vehicle 102.

The method 700 may proceed to block 704, wherein the method 700 may include analyzing the naturalistic driving behavior data set to determine naturalistic driving behavior associated with controlling the vehicle 102. In an exemplary embodiment, upon determining the one or more driving scene scenarios and the one or more traffic related objects that may affect the operation of the vehicle 102 when traveling within the surrounding environment of the vehicle 102, the vehicle control module 136 may communicate with the neural network 116 to determine naturalistic driving behavior associated with controlling the vehicle 102 with respect to the one or more driving scene scenarios and the one or more traffic related objects.

In particular, the vehicle control module 136 may communicate with the neural network 116 to analyze the one or more driving scene scenarios and the one or more traffic related objects to predict one or more possible driving maneuvers that may be utilized to safely navigate the vehicle 102. Upon predicting the one or more possible driving maneuvers, the vehicle control module 136 may communicate with the neural network processing unit 118 to access the naturalistic driving behavior data set 120 and to utilize machine learning/deep learning to predict one or more events associated with one or more possible driving maneuvers based on the one or more driving scene scenarios and the one or more traffic related objects.

In one embodiment, the neural network processing unit may utilize the CNN 128 and sensor data to encode each video/image frame provided by the vehicle camera system 110 by extracting convolutional features (e.g., features extracted from shallow, medium, and deep layers) using an InceptionResnet-C2 network (e.g., hybrid deep learning network) and may pool them using a fixed-length vector. Sensor data may also be fused (as discussed above) to the image data and such data may be fed to a LSTM to predict a behavior label. The neural network processing unit 118 may predict that the operation of the vehicle 102 may require one or more driving maneuvers.

Upon the prediction of the one or more driving maneuvers, the neural network processing unit 118 may query the naturalistic driving behavior data set 120 to retrieve annotations and additional data associated with the goal-oriented action(s) determined and classified utilizing the TRN 122 and/or the stimulus-driven action(s) determined and classified utilizing the CNN 128. The neural network processing unit 118 may additionally query the naturalistic driving behavior data set 120 based on one or more traffic related objects that are determined (at block 702) to retrieve one or more annotations and related data associated with one or more attention capturing traffic related objects and/or causes associated with one or more stimulus-driven actions.

Additionally, the neural network processing unit 118 may query the naturalistic driving behavior data set based on one or more traffic related objects that are determined (at block 702) to retrieve annotations and additional data associated with one or more causes related to the one or more behavioral events classified as the stimulus-driven actions. Upon retrieving the one or more annotations and related data from the naturalistic driving behavior data set 120, the neural network processing unit 118 may communicate the one or more annotations and related data associated with the four-layer annotation scheme to the vehicle control module 136.

The method 700 may proceed to block 706, wherein the method 700 may include communicating with the ECU 104 of the vehicle 102 to autonomously control the vehicle 102 based on the naturalistic driving behavior data set. In an exemplary embodiment, upon receiving the annotations and related data associated with the four-layer annotation scheme, the vehicle control module 136 may analyze the data (e.g., annotations, related data, duration associated with each annotation, number of instances associated with each annotation) and may determine one or more driver behavior models that include one or more discrete actions that may be conducted to autonomously control the vehicle 102 utilizing naturalistic driving behavior.

The vehicle control module 136 may thereby communicate with the ECU 104 of the vehicle 102 to autonomously control the vehicle 102 to be driven based on the one or more driver behavior models that include the one or more discrete actions to implement naturalistic driving behaviors in various driving scenes and circumstances. The ECU 104 may communicate with one or more of the control units of the vehicle 102 to thereby control the vehicle 102 to be driven autonomously based on the naturalistic driving behavior data set 120 to control the vehicle 102 to execute naturalistic driving behavior with a high level of driving scene understanding.

Figure 8:
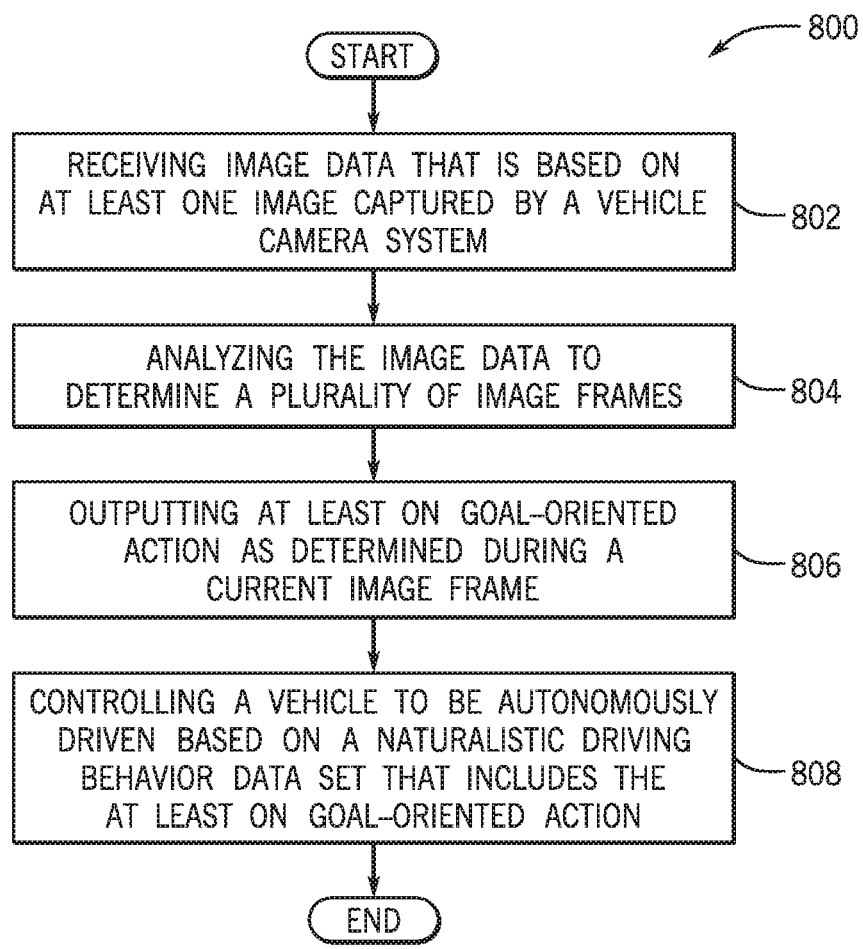
FIG. 8 is a process flow diagram of a method for utilizing a temporal recurrent network for online action detection according to an exemplary embodiment of the present disclosure.

FIG. 8 is a process flow diagram of a method 800 for utilizing a temporal recurrent network for online action detection according to an exemplary embodiment of the present disclosure. FIG. 8 will be described with reference to the components of FIG. 1, though it is to be appreciated that the method of FIG. 8 may be used with other systems/components. The method 800 may begin at block 802, wherein the method 800 may include receiving image data that is based on at least one image captured by a vehicle camera system.

The method 800 may proceed to block 804, wherein the method 800 may include analyzing the image data to determine a plurality of image frames. In one embodiment, the plurality of image frames include at least one past image frame, and a current image frame. The method 800 may proceed to block 806, wherein the method 800 may include outputting at least one goal-oriented action as determined during a current image frame. In one embodiment, the at least one goal-oriented action is based on the at least one past image frame, the current image frame, and a predicted action. The method 800 may proceed to block 808, wherein the method 800 may include controlling a vehicle to be autonomously driven based on a naturalistic driving behavior data set that includes the at least one goal-oriented action.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for utilizing a temporal recurrent network for online action detection, comprising:
   receiving image data that is based on at least one image captured by a vehicle camera system;
   analyzing the image data to determine a plurality of image frames, wherein the plurality of image frames include at least one past image frame, and a current image frame;
   completing feature representation of pseudo future information to output at least one predicted action based on sequentially running an encoder and a decoder of the temporal recurrent network with respect to spatial-temporal features included within the plurality of image frames;
   outputting at least one goal-oriented action as determined during the current image frame, wherein the at least one goal-oriented action is based on the at least one past image frame, the current image frame, and the at least one predicted action; and
   controlling a vehicle to be autonomously driven based on a naturalistic driving behavior data set that includes the at least one goal-oriented action, wherein the naturalistic driving behavior data set is stored and pre-trained with annotations associated with a plurality of goal-oriented actions.

2. The computer-implemented method of claim 1, wherein analyzing the image data to determine the plurality of image frames includes down sampling the image data, wherein the down sampled image data is converted into the plurality of image frames.

3. The computer-implemented method of claim 1, wherein analyzing the image data to determine the plurality of image frames includes performing spatial-temporal feature extraction that pertains to object recognition and scene recognition on the at least one past image frame and the current image frame.

4. The computer-implemented method of claim 3, wherein at least one feature vector is extracted from the at least one past image frame and the current image frame that is associated with at least one spatial-temporal feature within the at least one past image frame and the current image frame, wherein the at least one feature vector is classified from a target frame of the plurality of image frames into a predefined behavioral event that is determined from a list of predetermined driving behaviors stored upon the naturalistic driving behavior data set.

5. The computer-implemented method of claim 3, wherein outputting the at least one goal-oriented action includes decoding to output the at least one predicted action based on a feature representation that is predicted to occur at an immediate future point in time.

6. The computer-implemented method of claim 5, wherein a future representation of the at least one predicted action is obtained by average pooling hidden states based on the feature vectors associated with the spatial-temporal features extracted from the at least one past image frame and the current image frame, wherein the at least one predicted action is output based on the future representation of the at least one predicted action.

7. The computer-implemented method of claim 6, wherein outputting the at least one goal-oriented action includes the encoder of the temporal recurrent network concatenating at least one feature vector that is extracted for the at least one past image frame, the current image frame, and a future feature associated with the future representation of the predicted action.

8. The computer-implemented method of claim 7, wherein outputting the at least one goal-oriented action includes outputting at least one action determined during a current frame based on the concatenation completed by the encoder of the temporal recurrent network, wherein a driving scene is evaluated to determine at least one driver action that is conducted absent any external stimuli that is presented within a surrounding environment of the vehicle.

9. The computer-implemented method of claim 1, further including classifying at least one stimulus-driven action based on evaluating at least one behavioral event and the image data, wherein an external stimuli is determined to be a cause of the at least one behavioral event, wherein controlling the vehicle to be autonomously driven is based on the naturalistic driving behavior data set that includes the at least one stimulus-driven action.

10. A system for utilizing a temporal recurrent network for online action detection, comprising:
a memory storing instructions when executed by a processor cause the processor to:
receive image data that is based on at least one image captured by a vehicle camera system;
analyze the image data to determine a plurality of image frames, wherein the plurality of image frames include at least one past image frame, and a current image frame;
complete feature representation of pseudo future information to output at least one predicted action based on sequentially running an encoder and a decoder of the temporal recurrent network with respect to spatial-temporal features included within the plurality of image frames;
output at least one goal-oriented action as determined during the current image frame, wherein the at least one goal-oriented action is based on the at least one past image frame, the current image frame, and at least one predicted action; and
control a vehicle to be autonomously driven based on a naturalistic driving behavior data set that includes the at least one goal-oriented action, wherein the naturalistic driving behavior data set is stored and pre-trained with annotations associated with a plurality of goal-oriented actions.

11. The system of claim 10, wherein analyzing the image data to determine the plurality of image frames includes down sampling the image data, wherein the down sampled image data is converted into the plurality of image frames.

12. The system of claim 10, wherein analyzing the image data to determine the plurality of image frames includes performing spatial-temporal feature extraction that pertains to object recognition and scene recognition on the at least one past image frame and the current image frame.

13. The system of claim 12, wherein at least one feature vector is extracted from the at least one past image frame and the current image frame that is associated with at least one spatial-temporal feature within the at least one past image frame and the current image frame, wherein the at least one feature vector is classified from a target frame of the plurality of image frames into a predefined behavioral event that is determined from a list of predetermined driving behaviors stored upon the naturalistic driving behavior data set.

14. The system of claim 12, wherein outputting the at least one goal-oriented action includes decoding to output the at least one predicted action based on a feature representation that is predicted to occur at an immediate future point in time.

15. The system of claim 14, wherein the future representation of the at least one predicted action is obtained by average pooling hidden states based on the feature vectors associated with the spatial-temporal features extracted from the at least one past image frame and the current image frame, wherein the at least one predicted action is output based on the future representation of the at least one predicted action.

16. The system of claim 15, wherein outputting the at least one goal-oriented action includes the encoder of the temporal recurrent network concatenating at least one feature vector that is extracted for the at least one past image frame, the current image frame, and a future feature associated with the future representation of the predicted action.

17. The system of claim 16, wherein outputting the at least one goal-oriented action includes outputting at least one action determined during a current frame based on the concatenation completed by the encoder of the temporal recurrent network, wherein a driving scene is evaluated to determine at least one driver action that is conducted absent any external stimuli that is presented within a surrounding environment of the vehicle.

18. The system of claim 10, further including classifying at least one stimulus-driven action based on evaluating at least one behavioral event and the image data, wherein an external stimuli is determined to be a cause of the at least one behavioral event, wherein controlling the vehicle to be autonomously driven is based on the naturalistic driving behavior data set that includes the at least one stimulus-driven action.

19. A non-transitory computer readable storage medium storing instructions that when executed by a computer, which includes a processor perform a method, the method comprising:
receiving image data that is based on at least one image captured by a vehicle camera system;
analyzing the image data to determine a plurality of image frames, wherein the plurality of image frames include at least one past image frame, and a current image frame;
completing feature representation of pseudo future information to output at least one predicted action based on sequentially running an encoder and a decoder of the temporal recurrent network with respect to spatial-temporal features included within the plurality of image frames;
outputting at least one goal-oriented action as determined during the current image frame, wherein the at least one goal-oriented action is based on the at least one past image frame, the current image frame, and at least one predicted action; and controlling a vehicle to be autonomously driven based on a naturalistic driving behavior data set that includes the at least one goal-oriented action, wherein the naturalistic driving behavior data set is stored and pre-trained with annotations associated with a plurality of goal-oriented actions.

20. The non-transitory computer readable storage medium of claim 19, further including classifying at least one stimulus-driven action based on evaluating at least one behavioral event and the image data, wherein an external stimuli is determined to be a cause of the at least one behavioral event, wherein controlling the vehicle to be autonomously driven is based on the naturalistic driving behavior data set that includes the at least one stimulus-driven action.

* * * * *